(12) United States Patent
Wang et al.

(10) Patent No.: US 10,783,071 B2
(45) Date of Patent: Sep. 22, 2020

(54) DATA STORAGE DEVICE AND OPERATING METHOD THEREOF, WHEREIN MAPPING TABLE FOR VALID DATA OF SOURCE BLOCK THAT HAS NOT BEEN COPIED TO DESTINATION BLOCK HAS A HIGHER PRIORITY THAN MAPPING INFORMATION COLLECTED BY REVERSE SCANNING FROM END OF THE DESTINATION BLOCK

(71) Applicant: Silicon Motion, Inc., Jhubei (TW)

(72) Inventors: Ting-Hsing Wang, Taoyuan (TW); Yang-Chih Shen, Taoyuan (TW)

(73) Assignee: Silicon Motion, Inc., Jhubei (TW)

(*) Notice: Subject to any disclaimer, the term of this patent is extended or adjusted under 35 U.S.C. 154(b) by 102 days.

(21) Appl. No.: 16/197,034

(22) Filed: Nov. 20, 2018

(65) Prior Publication Data

US 2019/0087326 A1   Mar. 21, 2019

Related U.S. Application Data

(62) Division of application No. 15/802,065, filed on Nov. 2, 2017, now Pat. No. 10,642,729.

(30) Foreign Application Priority Data

Mar. 7, 2017 (TW) .............................. 106107357 A

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0659* (2013.01); *G06F 3/0679* (2013.01); *G06F 2212/7201* (2013.01); *G06F 2212/7205* (2013.01)

(58) Field of Classification Search
CPC .. G06F 12/0246; G06F 3/0679; G06F 3/0659; G06F 3/061; G06F 2212/7201; G06F 2212/7205
See application file for complete search history.

(56) References Cited

U.S. PATENT DOCUMENTS

| 5,777,608 A ‡ | 7/1998 | Lipovski | ................... G06F 7/02 345/51 |
| 2003/0161186 A1* | 8/2003 | Aasheim | ............. G06F 12/0246 365/185.29 |
| 2006/0184723 A1‡ | 8/2006 | Sinclair | ................. G06F 3/0608 711/10 |
| 2009/0172263 A1‡ | 7/2009 | Olbrich | ............... G06F 13/1657 711/10 |
| 2013/0073798 A1‡ | 3/2013 | Kang | .................. G06F 12/0246 711/10 |
| 2013/0339585 A1* | 12/2013 | Conley | ............... G06F 12/0246 711/103 |
| 2017/0098463 A1* | 4/2017 | Kawai | ................ G11B 20/1889 |

* cited by examiner
‡ imported from a related application

*Primary Examiner* — William B Partridge
*Assistant Examiner* — Chie Yew
(74) *Attorney, Agent, or Firm* — Wang Law Firm, Inc.

(57) ABSTRACT

A data storage device with a non-volatile memory on which a garbage collection operation is segmented to be accomplished at separate time intervals. Host commands are inserted to be executed between the separate time intervals. A data swap stage or/and an F2H table update stage or/and an H2F table update stage for a garbage collection operation may be segmented to be performed at separate time intervals.

8 Claims, 12 Drawing Sheets

DATA STORAGE DEVICE AND OPERATING METHOD THEREOF, WHEREIN MAPPING TABLE FOR VALID DATA OF SOURCE BLOCK THAT HAS NOT BEEN COPIED TO DESTINATION BLOCK HAS A HIGHER PRIORITY THAN MAPPING INFORMATION COLLECTED BY REVERSE SCANNING FROM END OF THE DESTINATION BLOCK

CROSS REFERENCE TO RELATED APPLICATIONS

This Application is a divisional of U.S. application Ser. No. 15/802,065, filed on Nov. 2, 2017, which claims priority to Taiwan Patent Application No. 106107357, filed on Mar. 7, 2017, the entirety of which are incorporated by reference herein.

BACKGROUND OF THE INVENTION

Field of the Invention

The present invention relates to data storage devices and in particular to garbage collection therefor.

Description of the Related Art

There are various forms of non-volatile memory used in data storage devices for long-term data retention, such as a flash memory, magnetoresistive RAM, ferroelectric RAM, resistive RAM, spin transfer torque-RAM (STT-RAM), and so on.

When a non-volatile memory is utilized in data storage, a garbage collection operation is usually performed and thereby blocks with no valid data left can be erased and reused to store data. The physical structure of the blocks allocated in a non-volatile memory is becoming more and more complex as the capacity for data storage grows. How to efficiently perform a garbage collection operation without dragging down the efficiency of the system resources is an important issue.

BRIEF SUMMARY OF THE INVENTION

A data storage device in accordance with an exemplary embodiment of the disclosure includes a non-volatile memory and a microcontroller. The non-volatile memory comprises a plurality of physical blocks. The microcontroller selects one source block and one destination block from the plurality of physical blocks to perform a garbage collection operation and segments the garbage collection operation by copying valid data from the source block to the destination block at separate time intervals. Between the separate time intervals, the microcontroller executes commands issued by a host.

A data storage device in accordance with another exemplary embodiment of the disclosure includes a non-volatile memory and a microcontroller. The non-volatile memory comprises a plurality of physical blocks. The microcontroller selects one source block and one destination block from the plurality of physical blocks to perform a garbage collection operation and segments an update of a mapping table F2H of the destination block by updating the mapping table F2H of the destination block at separate time intervals. Between the separate time intervals, the microcontroller executes commands issued by a host.

A data storage device in accordance with another exemplary embodiment of the disclosure includes a non-volatile memory and a microcontroller. The non-volatile memory comprises a plurality of physical blocks. The microcontroller selects one source block and one destination block from the plurality of physical blocks to perform a garbage collection operation, wherein the destination block is scanned from an end of the destination block by the microcontroller to perform a reverse scan for an update of a mapping table H2F. The microcontroller segments the reverse scan by performing the reverse scan at separate time intervals. The mapping table H2F shows a mapping relationship between logical addresses and physical addresses of data. Between the separate time intervals, the microcontroller executes commands issued by a host.

In another exemplary embodiment, a method for operating a data storage device is introduced which includes the following steps: selecting one source block and one destination block from a plurality of physical blocks of a non-volatile memory; performing a garbage collection operation and segmenting the garbage collection operation by copying valid data from the source block to the destination block at separate time intervals; and between the separate time intervals, executing commands issued by a host.

In another exemplary embodiment, a method for operating a data storage device is introduced which includes the following steps: selecting one source block and one destination block from a plurality of physical blocks of a non-volatile memory; performing a garbage collection operation to copy valid data from the source block to the destination block, wherein an update of a mapping table F2H of the destination block is segmented by updating the mapping table F2H of the destination block at separate time intervals; and between the separate time intervals, executing commands issued by a host.

In another exemplary embodiment, a method for operating a data storage device is introduced which includes the following steps: selecting one source block and one destination block from a plurality of physical blocks of a non-volatile memory; performing a garbage collection operation to copy valid data from the source block to the destination block, wherein the destination block is scanned from an end of the destination block to perform a reverse scan for an update of a mapping table H2F and the reverse scan is segmented by performing the reverse scan at separate time intervals, and the mapping table H2F shows a mapping relationship between logical addresses and physical addresses of data; and between the separate time intervals, executing commands issued by a host.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

A non-volatile memory may be a memory device for long-term data retention such as a flash memory, a magnetoresistive RAM, a ferroelectric RAM, a resistive RAM, a spin transfer torque-RAM (STT-RAM) and so on. The following discussion is regarding flash memory in particular as an example, but it is not intended to be limited thereto.

Figure 1:
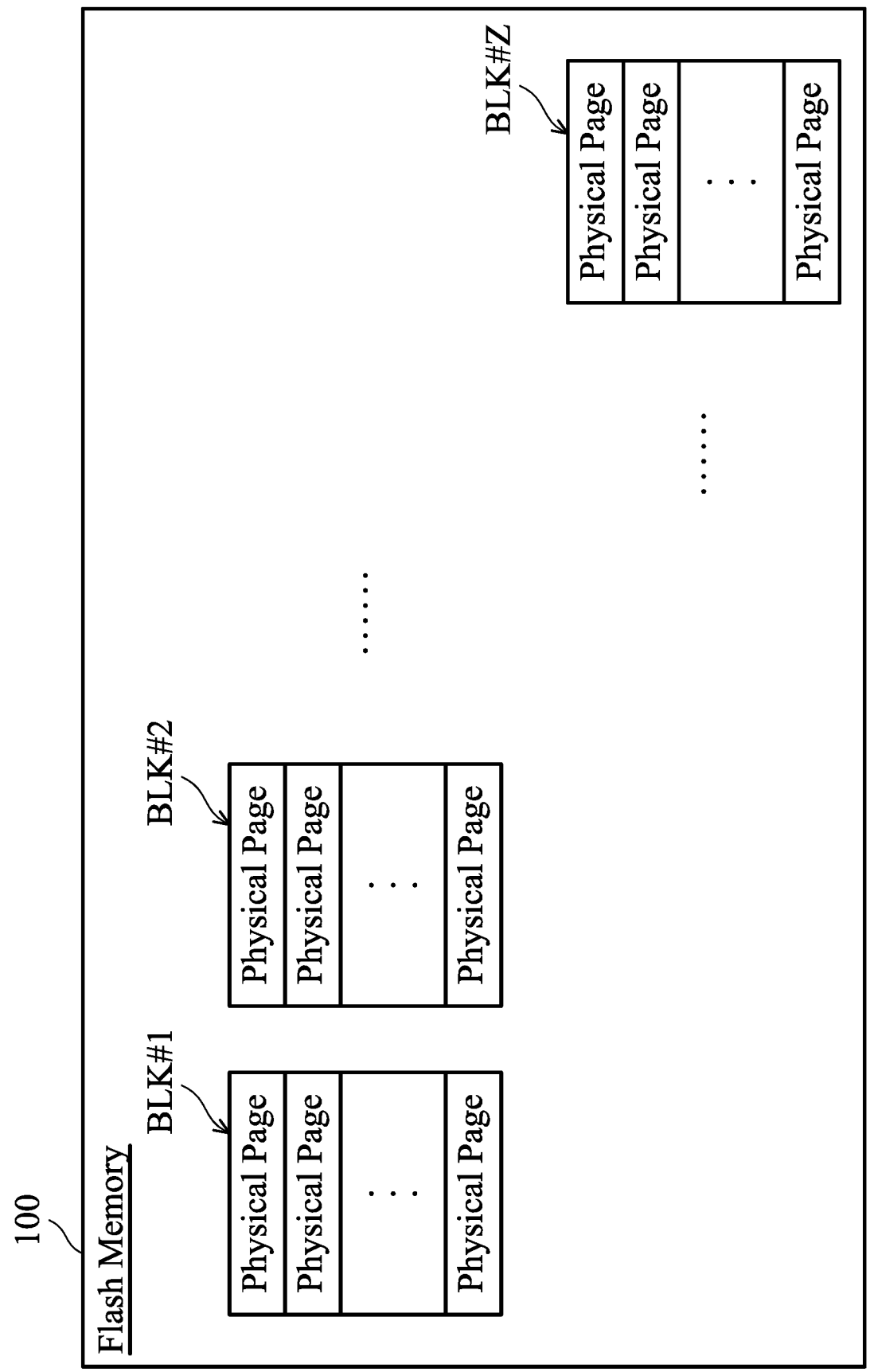
FIG. 1 illustrates the storage space of a flash memory 100.

FIG. 1 illustrates the storage space of a flash memory 100, which is divided into physical blocks BLK #1, BLK #2 BLK # Z, etc., where Z is a positive integer. Each physical block includes a plurality of physical pages. For example, one physical block may include 256 physical pages. Each physical page may be allocated to store data of a predetermined length. For example, each physical page may be allocated to store data of 16 KB. Furthermore, there is a spare area for each physical page to store metadata. Multiple physical pages, such as three, may share the same word line to be accessed or managed. Each physical page may be further divided into a plurality of memory cells. For example, one memory cell may be 4 KB. In an exemplary embodiment, each memory cell stores data of 4 KB with the corresponding logical block address LBA (e.g. LBA #0) stored in the aforementioned spare area. In another exemplary embodiment, each memory cell can store up to 8 sectors of 512 B with the corresponding logical block addresses LBAs (e.g. LBA #0-LBA #7) stored in the aforementioned spare area. For simplicity, each memory cell discussed in the specification is used to store data of 4 KB but not intended to be limited thereto. The mapping between LBA of data (arranged by a host) and a location/address (e.g. a physical address) allocated to store the data is recorded into a mapping table H2F for data management. In an exemplary embodiment, mapping information is listed in the mapping table H2F in the order of LBAs (not intended to be limited thereto). In another exemplary embodiment, mapping information is listed in the mapping table H2F according to the order that the data is stored into the flash memory. In addition to the mapping table H2F, other mapping tables may be established by the user for management of the data stored in the flash memory 100. The other mapping tables can further be used in rebuilding the mapping table H2F. In an exemplary embodiment, a mapping table F2H is introduced to record the mapping between a location/address of data stored in the flash memory 100 and LBA of the data. In an exemplary embodiment, mapping information is listed in the mapping table F2H in the order of physical pages or memory cells.

The flash memory 100 is often used as a storage medium in today's data storage devices, for implementations of a memory card, a USB flash device, an SSD and so on. In another exemplary embodiment, the flash memory 100 is packaged with a controller to form a multiple-chip package and named eMMC.

Figure 2:
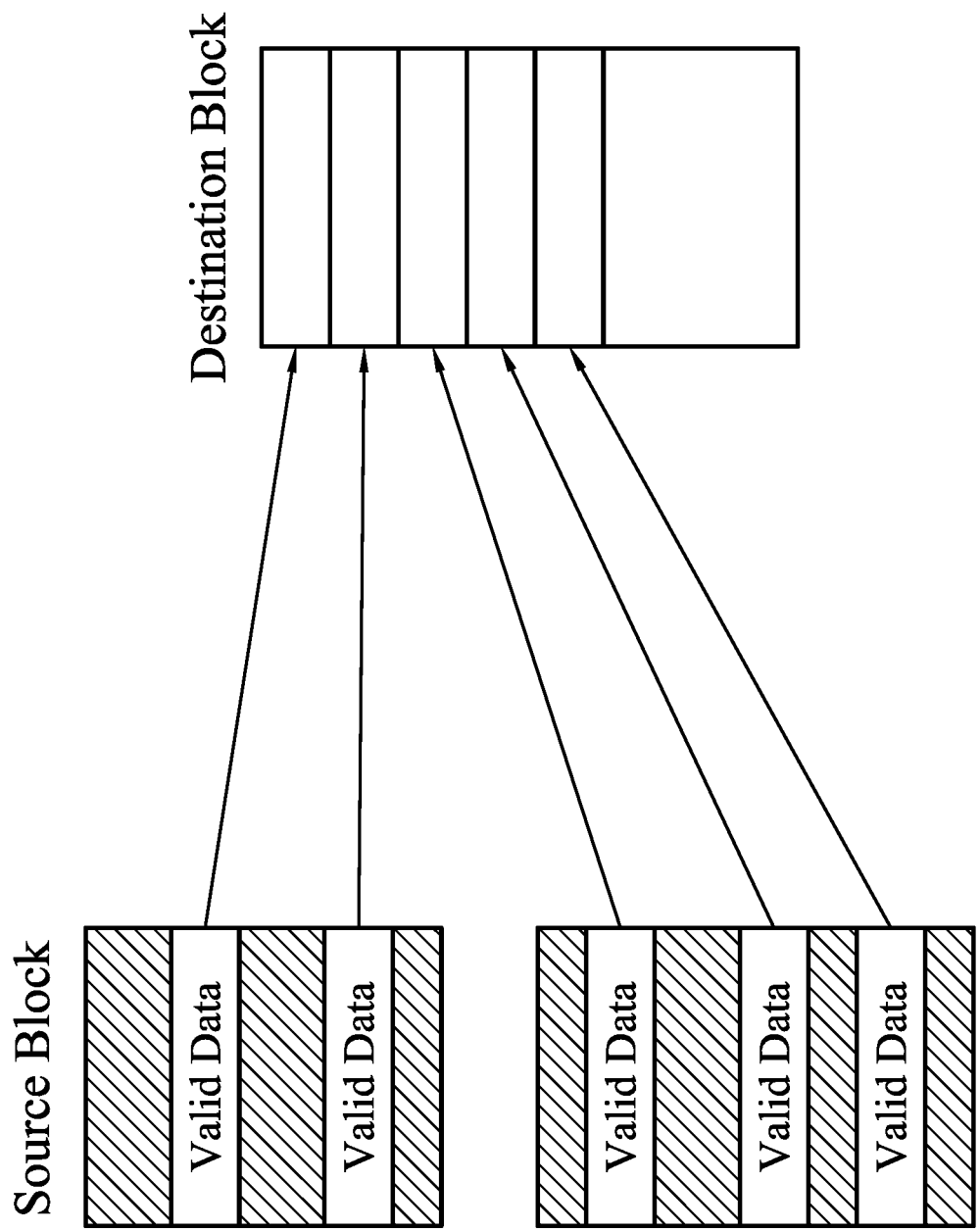
FIG. 2 illustrates the concept of garbage collection.

When updating the data stored in the flash memory 100, the new data is written into a spare area rather than being rewritten over the storage space of the old data. The old data is invalidated. Frequent write operations make the storage space is flooded with invalid data. A garbage collection operation is introduced to operate the flash memory 100 to process the physical blocks containing a lot of invalid data. FIG. 2 illustrates the concept of garbage collection. The slashes indicate the invalid data. Valid data in source blocks is copied to a destination block. The source block whose valid data has been entirely copied to the destination block may be erased and redefined as a spare block. In another exemplary embodiment, the source block whose valid data has been copied to the destination block is redefined as a spare block and is not erased until the spare block is selected to store data again. To improve the operational efficiency, a garbage collection operation is segmented to be completed at separate time intervals and commands from a host can be inserted between the separate time intervals. In this manner, the system resource is not occupied before a garbage collection operation is completed and the system performance is considerably improved.

Figure 3:
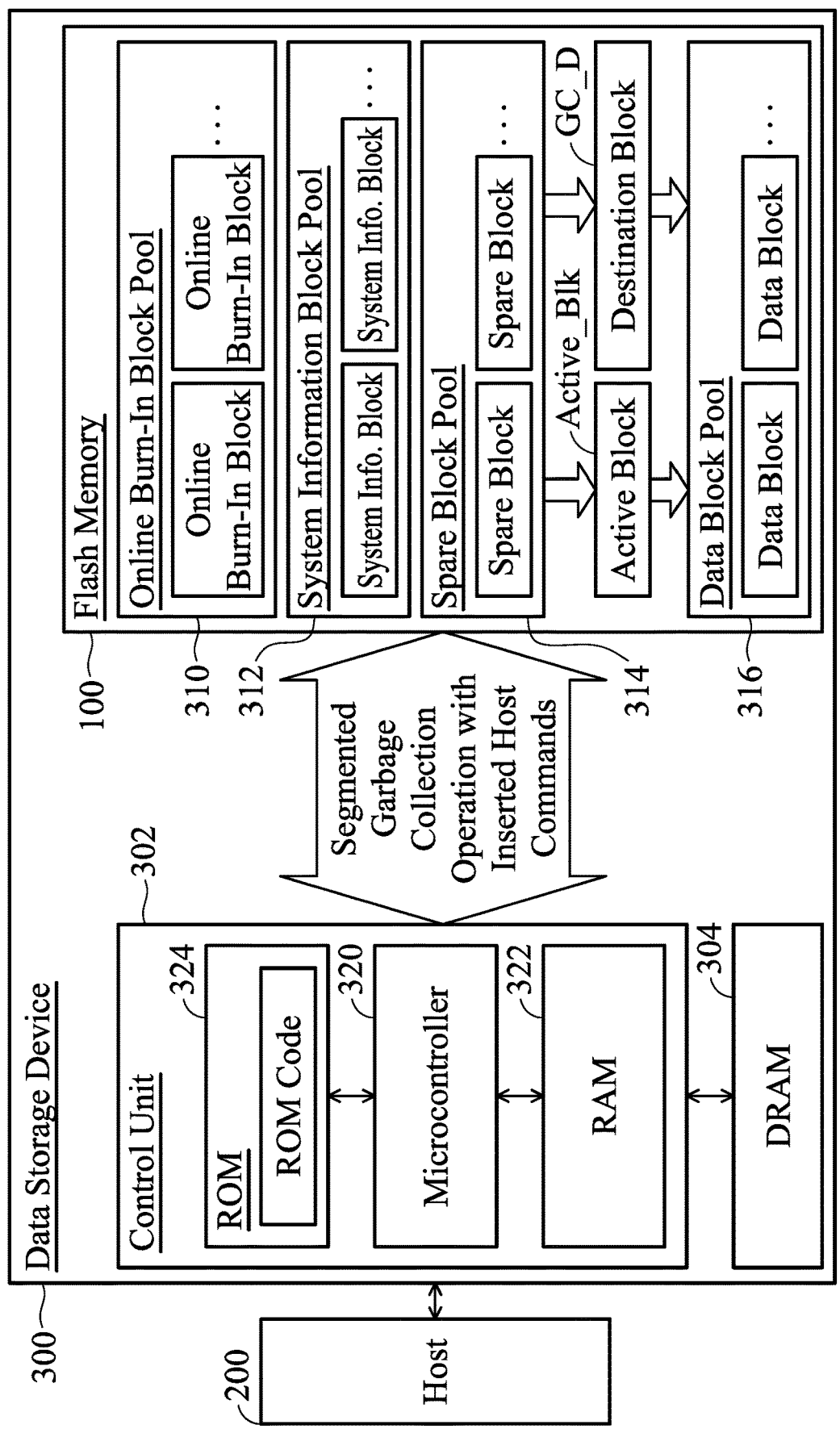
FIG. 3 is a block diagram depicting a data storage device 300 in accordance with an exemplary embodiment of the disclosure.

FIG. 3 is a block diagram depicting a data storage device 300 in accordance with an exemplary embodiment of the disclosure, which includes the flash memory 100 and a control unit 302. The control unit 302 is coupled between a host 200 and the flash memory 100 to operate the flash memory 100 in accordance with the commands issued by the host 200. A DRAM 304 is optionally provided within the data storage device 300 as a data buffer.

The space of the flash memory 100 is allocated to provide: an online burn-in block pool 310, a system information block pool 312, a spare block pool 314, a data block pool 316, an active block Active_Blk and a destination block GC_D. The destination block GC_D is allocated to collect valid data for garbage collection. The blocks within the online burn-in block pool 310 store in-system programming (ISP) code. The blocks within the system information block pool 312 store system information, such as a mapping table H2F. The active block Active_Blk is provided from the spare block pool 314 to receive data from the host 200. After the active block Active_Blk finishes receiving data, the active block Active_Blk is pushed into the data block pool 316. The destination block GC_D is also provided from the spare block pool 314. Source blocks to be released by garbage collection may be selected from the data block pool 316. The source block whose valid data has been copied to the destination block GC_D may be redefined as a spare block.

The control unit 302 includes a microcontroller 320, a random access memory space 322 and a read-only memory 324. The random access memory space 322 may be implemented by DRAM(s) or/and SRAM(s). In an exemplary embodiment, the random access memory space 322 and the microcontroller 320 may be fabricated on the same die. The DRAM 304 may be not fabricated on the same die with the microcontroller 320. The read-only memory 324 stores ROM code. The microcontroller 320 operates by executing the ROM code obtained from the read-only memory 324 or/and the ISP code obtained from the online burn-in block pool 310 of the flash memory 100. The microcontroller 320 may dynamically manage the mapping table H2F or sub mapping tables H2F_G in the random access memory space 322. The mapping table H2F may be formed by the sub mapping tables H2F_G and the size of each sub mapping table H2F_G may equal to the size of one physical page or the size of one memory cell to facilitate the storage and management of the sub mapping table H2F_G, but not intended to be limited thereto. The mapping table H2F is used in the following exemplary embodiments as an example, but not limited thereto. The microcontroller 320 may further dynamically manage the mapping tables F2H of the active block Active_Blk and the destination block GC_D in the random access memory space 322.

The microcontroller 320 segments a garbage collection operation by performing garbage collection operation by separate time intervals. Between the separate time intervals, the microcontroller 320 executes the commands (e.g. read/write requests) that the host 200 issues. Generally, a garbage collection operation involves four stages. Valid data is copied (moved) in the first stage (as known as data swapping). In the second stage, a mapping table F2H of the destination block GC_D is updated. In the third stage, information about EOB (end of a block) for the destination block GC_D is written into the destination block GC_D. In the fourth stage, a mapping table H2F is updated. In the disclosure, depending on the user's need, the first stage or/and the second stage or/and the fourth stage is segmented to be performed at separate time intervals.

Figure 4:
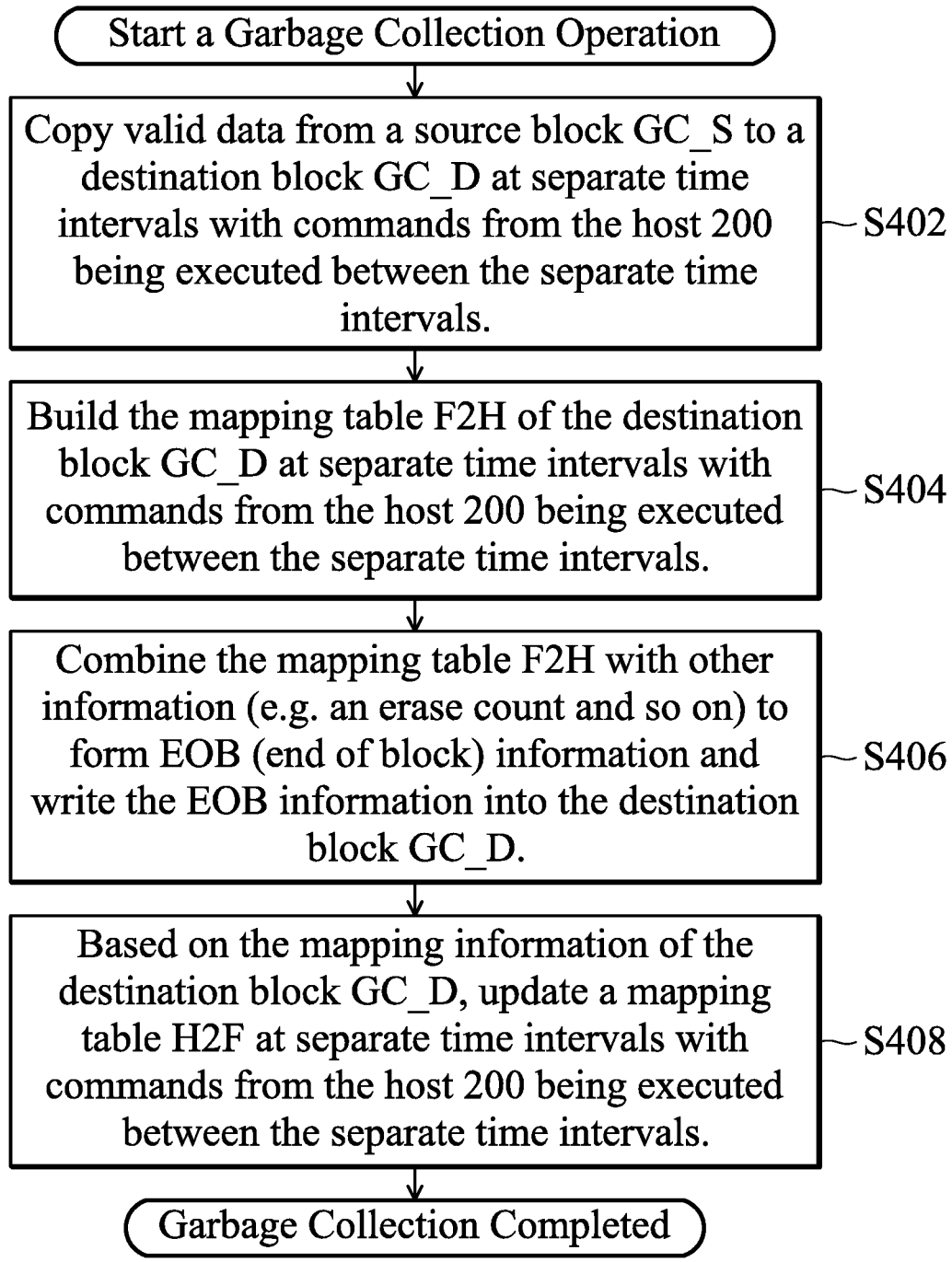
FIG. 4 is a flowchart depicting a garbage collection operation in accordance with an exemplary embodiment of the disclosure.

FIG. 4 is a flowchart depicting a garbage collection operation in accordance with an exemplary embodiment of the disclosure. Referring to FIG. 4, a garbage collection operation starts and then step S402 is performed to copy valid data from a source block (hereinafter GC_S) to a destination block GC_D at separate time intervals with commands from the host 200 being executed between the separate time intervals. When there is no space in the destination block GC_D to store the copy of valid data from the source block GC_S, step S404 is performed to build the mapping table F2H of the destination block GC_D at separate time intervals with commands from the host 200 being executed between the separate time intervals. In step S406, the mapping table F2H is combined with other information (e.g. an erase count and so on) to form EOB (end of block) information and the EOB information is written into the destination block GC_D (for example, attached at the end of the destination block GC_D). In step S408, the mapping information of the destination block GC_D is used in updating a mapping table H2F at separate time intervals with commands from the host 200 being executed between the separate time intervals. Finally, the destination block GC_D is pushed into the data block pool 316 and the garbage collection operation is completed.

Figure 5:
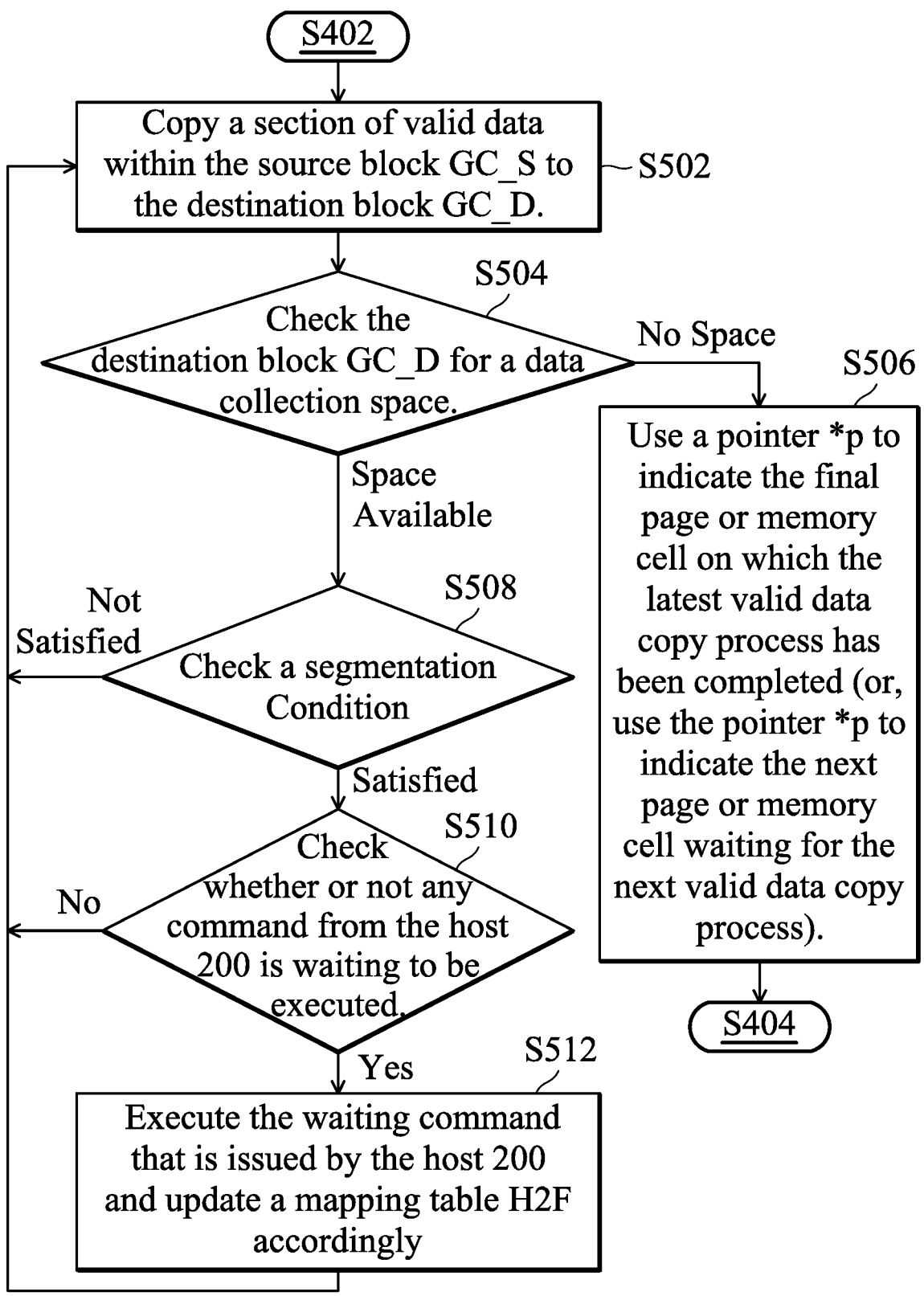
FIG. 5 depicts step S402 in detail in accordance with an exemplary embodiment of the disclosure.

FIG. 5 depicts step S402 in detail in accordance with an exemplary embodiment of the disclosure. In step S502, a section of valid data within the source block GC_S is copied to the destination block GC_D. One or more data blocks may be selected from the data block pool 316 as the source block GC_S. The selection of the source block GC_S may depend on one or more parameters, such as an erase count, an access count, an order in which data is written, data writing time, and so on, but not intended to be limited thereto.

In step S504, the destination block GC_D is checked for a data collection space. When the destination block GC_D has no space to store valid data copied from the source block GC_S, step S506 is performed to use a pointer (*p, indicating a copy terminal) to indicate the final page or memory cell on which the latest valid data copy process has been completed. In another exemplary embodiment, the pointer *p is used to indicate the next page or memory cell waiting for the next valid data copy process. After step S506, step S404 is performed. When it is determined in step S504 that the destination block GC_D still has a space for valid data collection, step S508 is performed to determine whether or not a segmentation condition is satisfied. If not, step S502 is performed to continue copying the valid data of the source block GC_S to the destination block GC_D. If yes, step S510 is performed to check whether or not any command from the host 200 is waiting to be executed. When no command is waiting, step S502 is performed to continue copying the valid data of the source block GC_S to the destination block GC_D. When a waiting command is obtained, step S512 is performed and the system resource is used in executing the waiting command that is issued by the host 200. For example, data read/write and the corresponding management of the mapping table H2F (e.g., an update of H2F due to a write operation) may be performed in step S512. After step S512, step S502 is performed to continue copying the valid data of the source block GC_S to the destination block GC_D. In an exemplary embodiment, pointers are used to manage data source or data destination, not intended to be limited thereto. In another exemplary embodiment, FIFOs are used to manage data source or data destination. In step S512, the system resource may be used to execute just a predetermined number of commands (e.g. five commands) issued by the host 200. When more than 5 commands are waiting to be executed, the remaining commands are executed in the next time step S512 is performed. The segmentation condition checked in step S508 may be a time limit being reached, a predetermined data amount being copied and/or replacement of the source block GC_S happening. The time limit may be prolonged due to underclocking caused by high temperature. In summary, the copy process of valid data performed in step S402 may be interrupted and performed at separate time intervals. Commands issued by the host 200 may be performed after the interruption or between the separate time intervals. In this manner, the data storage device 300 is not entirely dedicated to completing a garbage collection operation, and still has the capability to respond to commands issued by the host 200, and thereby the system performance of the data storage device 300 is improved and one of the objects of the disclosure is achieved.

Figure 6:
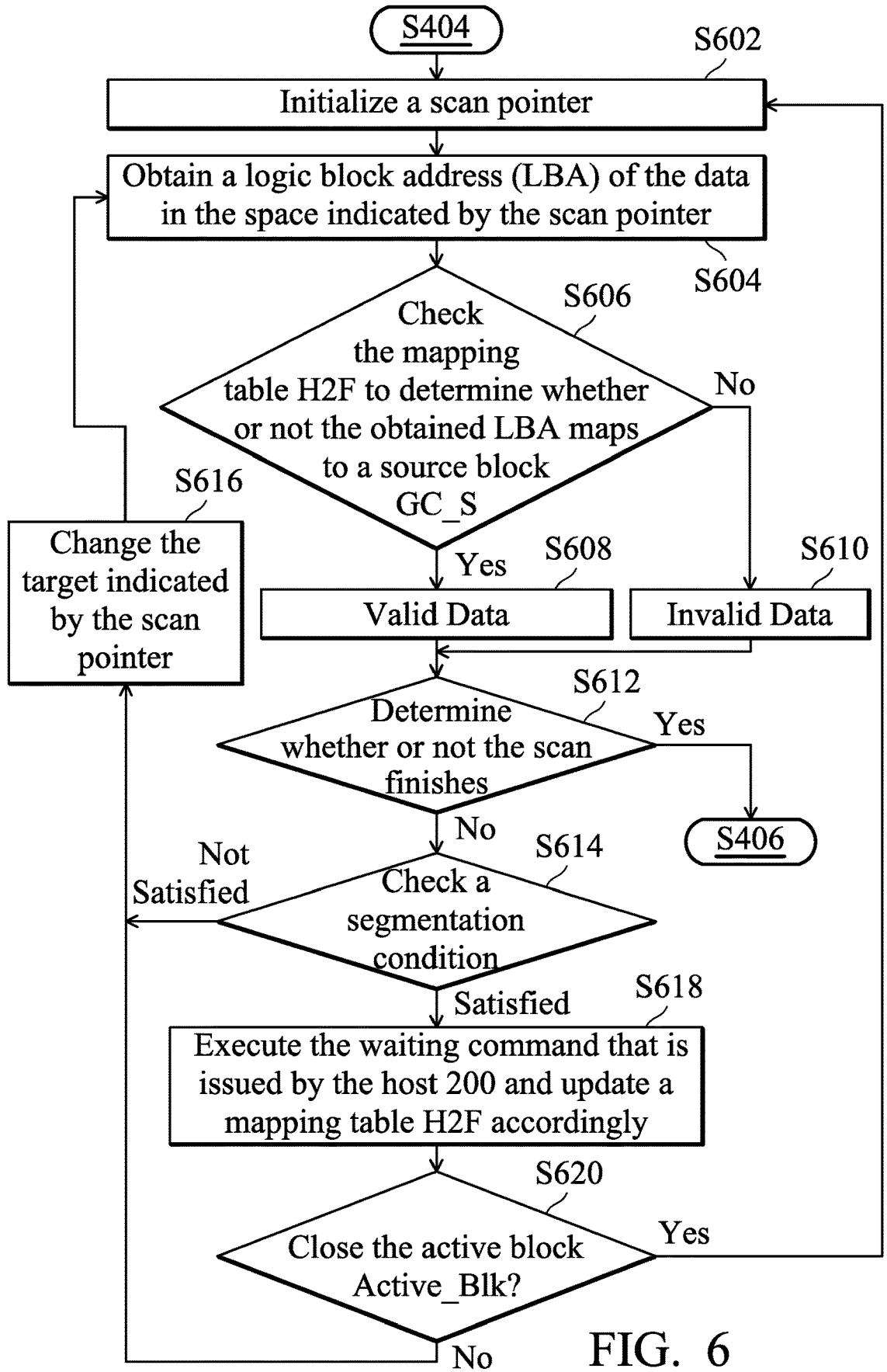
FIG. 6 depicts step S404 in detail in accordance with an exemplary embodiment of the disclosure.

FIG. 6 depicts step S404 in detail in accordance with an exemplary embodiment of the disclosure. In step S602, a scan pointer is initialized. The scan pointer showing an address is provided to indicate a page or a memory cell within the destination block GC_D. Because some data in the destination block GC_D may be invalidated in step S512, it is required to check the valid data in the destination block GC_D when building a mapping table F2H for the destination block GC_D.

In step S604, a logic block address (LBA) of the data in the space indicated by the scan pointer is obtained. In step S606, the mapping table H2F is checked to determine whether or not the obtained LBA maps to a source block GC_S. If yes, it is determined in step S608 that the data in the space indicated by the scan pointer is valid data. If not, it is determined in step S610 that invalid data is in the space indicated by the scan pointer.

In step S612, it is determined whether or not the scan finishes. It is checked whether the scan pointer shows the logical address of the last page or memory cell within the destination block GC_D. If yes, step S406 is performed. If no, it is determined in step S614 whether a segmentation condition is satisfied. If no, step S616 is performed to change the target indicated by the scan pointer (e.g. changed to scan the next page or the next memory cell) and then step S604 is performed. When the segmentation condition is satisfied, step S618 is performed and the system resource is used to execute the waiting command(s) issued by the host 200. For example, data read/write and the corresponding management of the mapping table H2F (e.g., an update of H2F due to a write operation) may be performed in step S618.

It is determined in step S620 whether or not the active block Active_Blk has been filled and has to be closed. If yes, step S602 is performed to restart the scan of the destination block GC_D to rebuild the mapping table F2H. If no, step S616 is performed to change the target indicated by the scan pointer. Note that an update of the mapping table H2F happens when the active block Active_Blk is closed. Thus, it is required to restart the scan of the destination block GC_D to correctly rebuild the mapping table F2H to prevent any misjudgments of valid data.

In summary, step S404 is performed to update the mapping table F2H of the destination block GC_D at separate time intervals with commands from the host 200 being executed between the separate time intervals. The data storage device 300 is not entirely dedicated to completing a garbage collection operation, and still has the capability to respond to commands issued by the host 200, and thereby the system performance of the data storage device 300 is improved and one of the objects of the disclosure is achieved.

Figure 7A:
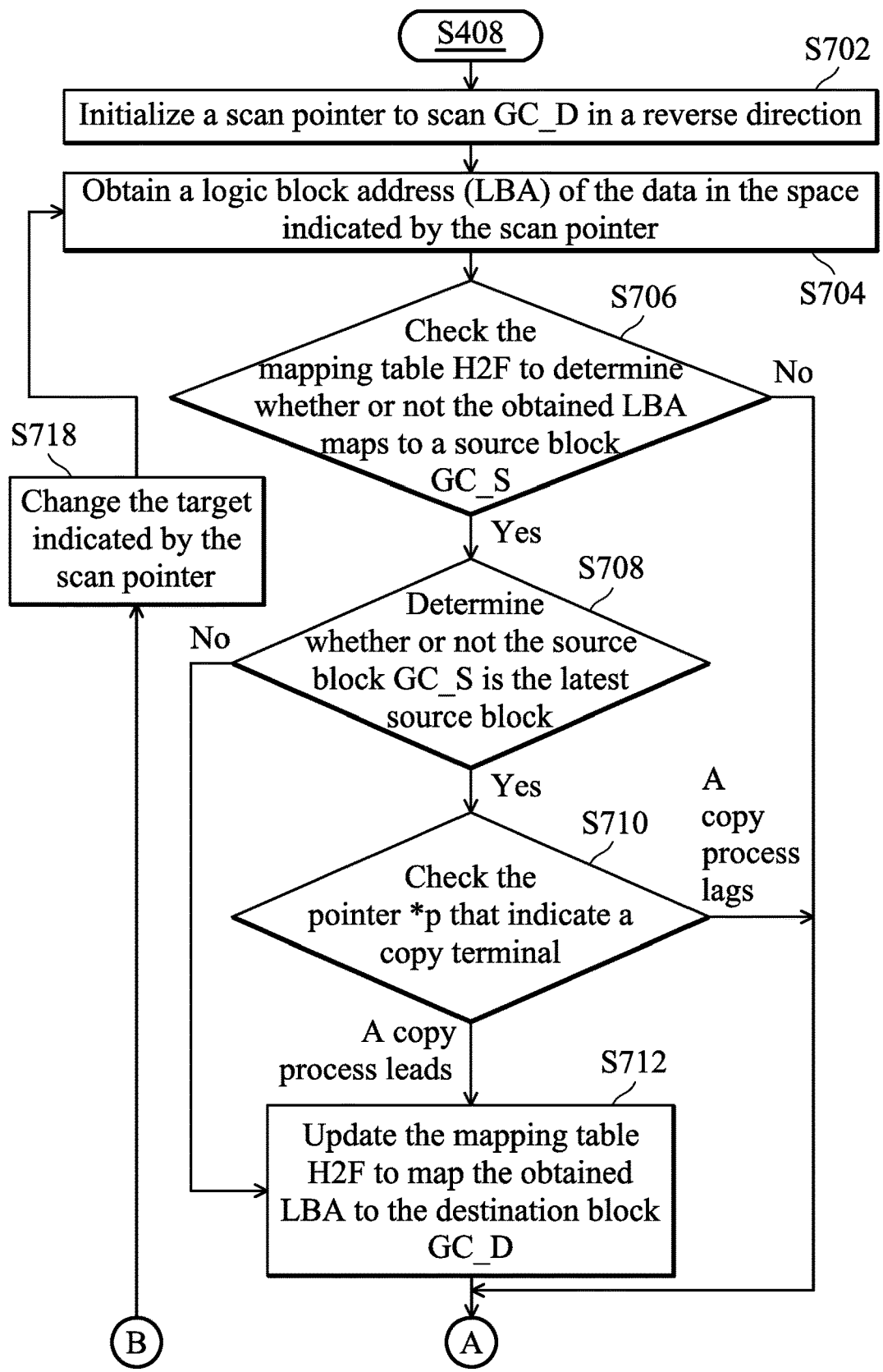
FIG. 7A and FIG. 7B depict step S408 in detail in accordance with an exemplary embodiment of the disclosure.
Figure 7B:
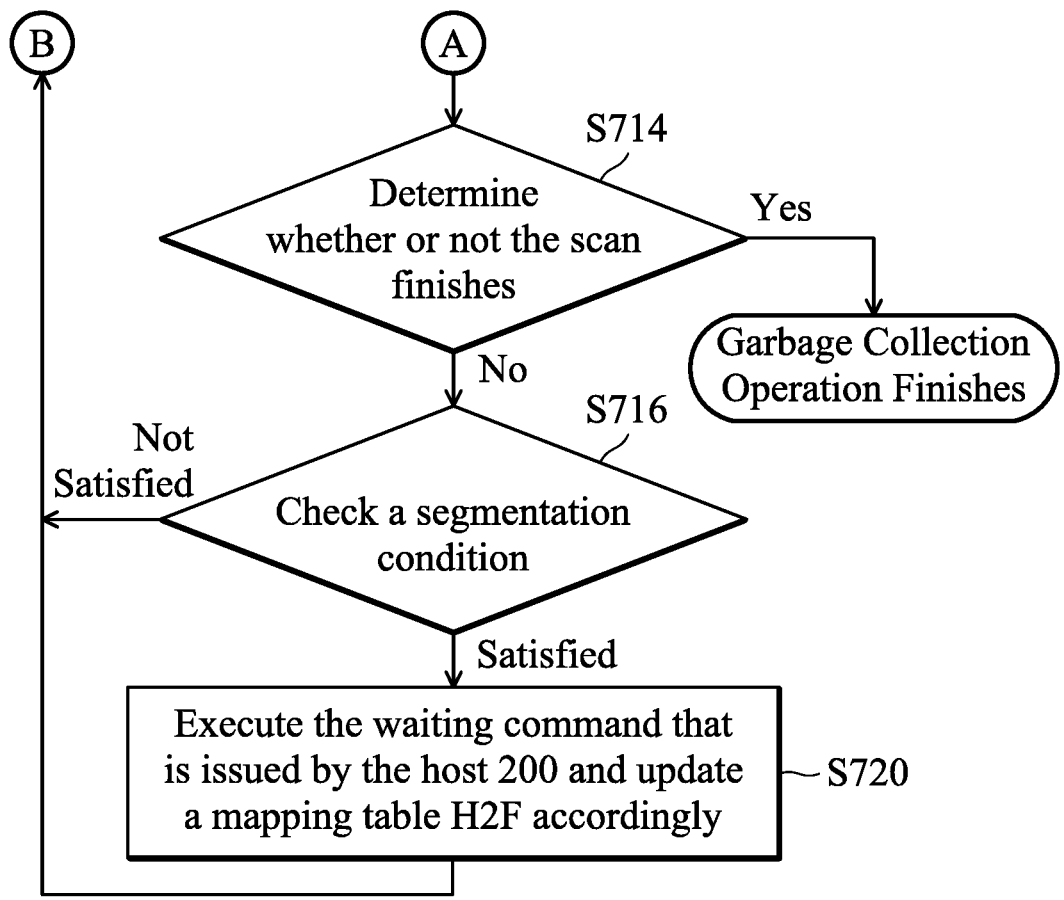

FIG. 7A and FIG. 7B depicts step S408 in detail in accordance with an exemplary embodiment of the disclosure. In step S702, a scan pointer is initialized. The scan pointer showing an address is provided to indicate a page or a memory cell within the destination block GC_D. The destination block GC_D is scanned to update the mapping table H2F and may be scanned in a reverse direction. The scan pointer may be initialized to the address of a final page of a final memory cell of the destination block GC_D to indicate the final page or the final memory cell of the destination block GC_D.

In step S704, a logic block address (LBA) of the data in the space indicated by the scan pointer is obtained. In step S706, the mapping table H2F is checked to determine whether the obtained LBA maps to a source block GC_S. If yes, it is determined in step S708 whether or not the source block GC_S is the latest source block based on the pointer *p set in step S506. If yes, based on the pointer *p, it is determined in step S710 to check whether a copy process for the valid data at the obtained LBA leads or lags. When the mapping table H2F shows that the obtained LBA corresponds to a physical space leading (e.g. at a lower physical address) the space indicated by the pointer *p, it means that the latest version of data of the obtained LBA has been copied to the destination block GC_D, and step S712 is performed accordingly to update the mapping table H2F to map the obtained LBA to the destination block GC_D. When the mapping table H2F shows that the obtained LBA corresponds to a physical space that lags (e.g. at a higher physical address) the space indicated by the pointer *p, it means that the latest data version of the obtained LBA is not maintained in the destination block GC_D. Thus, step S712 is skipped to prevent any erroneously updating of the mapping table H2F. Thus the mapping table H2F does not erroneously map the obtained LBA to the old data in the destination block GC_D. The mapping table H2F continues being correctly mapped to the latest source block (hereinafter Sf).

When it is determined in step S708 that the source block GC_S obtained from step S706 is not the latest source block Sf, step S710 is skipped and step S712 may be directly performed because the copy process for the valid data in the obtained source block GC_S is guaranteed complete. The mapping table H2F is updated to map the obtained LBA to the destination block GC_D.

When it is determined in step S706 that the mapping table H2F shows that the obtained LBA is not mapped to a source block GC_S, it means that the destination block GC_D does not maintain the latest data version of obtained LBA. Thus, steps S708 to S712 are all skipped to prevent any erroneously updating of the mapping table H2F. Thus the mapping table H2F does not erroneously map the obtained LBA to the old data in the destination block GC_D. The mapping table H2F continues being correctly mapped to the latest version of mapping information.

In step S714, it is determined whether or not the scan of the destination block GC_D finishes. If yes, the garbage collection operation finishes. If not, it is determined in step S716 whether or not a segmentation condition is satisfied. If no, step S718 is performed to change the target indicated by the scan pointer (e.g. changed to scan the page or the memory cell at the lower address, for performing a reverse scan) and then step S704 is performed. When the segmentation condition is satisfied, step S720 is performed and the system resource is used to execute the waiting command(s) issued by the host 200. For example, data read/write and the corresponding management of the mapping table H2F (e.g., an update of H2F due to a write operation) may be performed in step S720.

Figure 8:
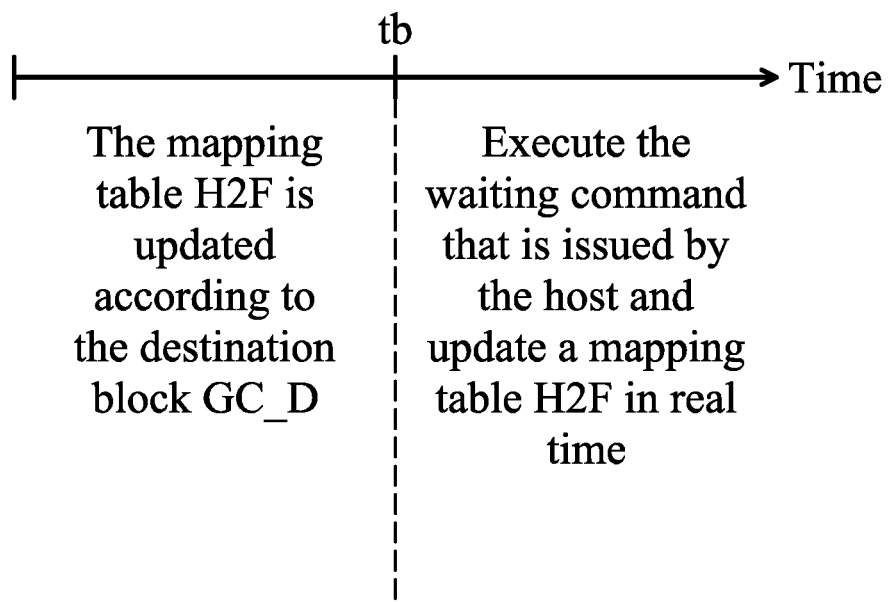
FIG. 8 shows an example for discussion of the reliability of mapping table H2F.

The following are exemplary embodiments showing how the reliability of mapping data is guaranteed. FIG. 8 shows an example for discussion of the reliability of mapping table H2F. Before segment point tb, the mapping table H2F is updated according to the destination block GC_D (e.g. referring to FIG. 7A and FIG. 7B, the scan procedure of the destination block GC_D for updating the mapping table H2F). The scan, however, is interrupted after the segment point tb. For example, the segmentation condition of step S716 of FIG. 7B is satisfied at the segment point tb. After the segment point tb, the system resource is used to execute the waiting command(s) issued by the host 200 and corresponding update of the mapping table H2F (e.g. corresponding to write operations) may be performed in real time (referring to step S720 of FIG. 7B).

After the segment point tb, the reliability of the mapping table H2F mainly depends on two major factors. First, the data updated by the host 200 after segment point tb should be carefully considered. Second, for the valid data that has been copied from the source block to the destination block GC_D and has not been amended after the segment point tb, the corresponding mapping information contained in the mapping table H2F that has not been correctly updated to map to the destination block GC_D should be carefully considered. For the data updated by the host 200 after the segment point tb, the mapping information obtained from the mapping table H2F is reliable because after the segment point tb the mapping table H2F is updated according to the update of data requested by the host 200 (referring to step S720). For the valid data that has been copied from the source block to the destination block GC_D and has not been amended after the segment point tb, the corresponding mapping information within the mapping table H2F that has not been correctly updated to map to the destination block GC_D is still acceptable (because the mapped data equals to the copy in the destination block GC_D). FIG. 8 shows that the mapping table H2F has a high reliability no matter before and after the segment point tb.

Figure 9:
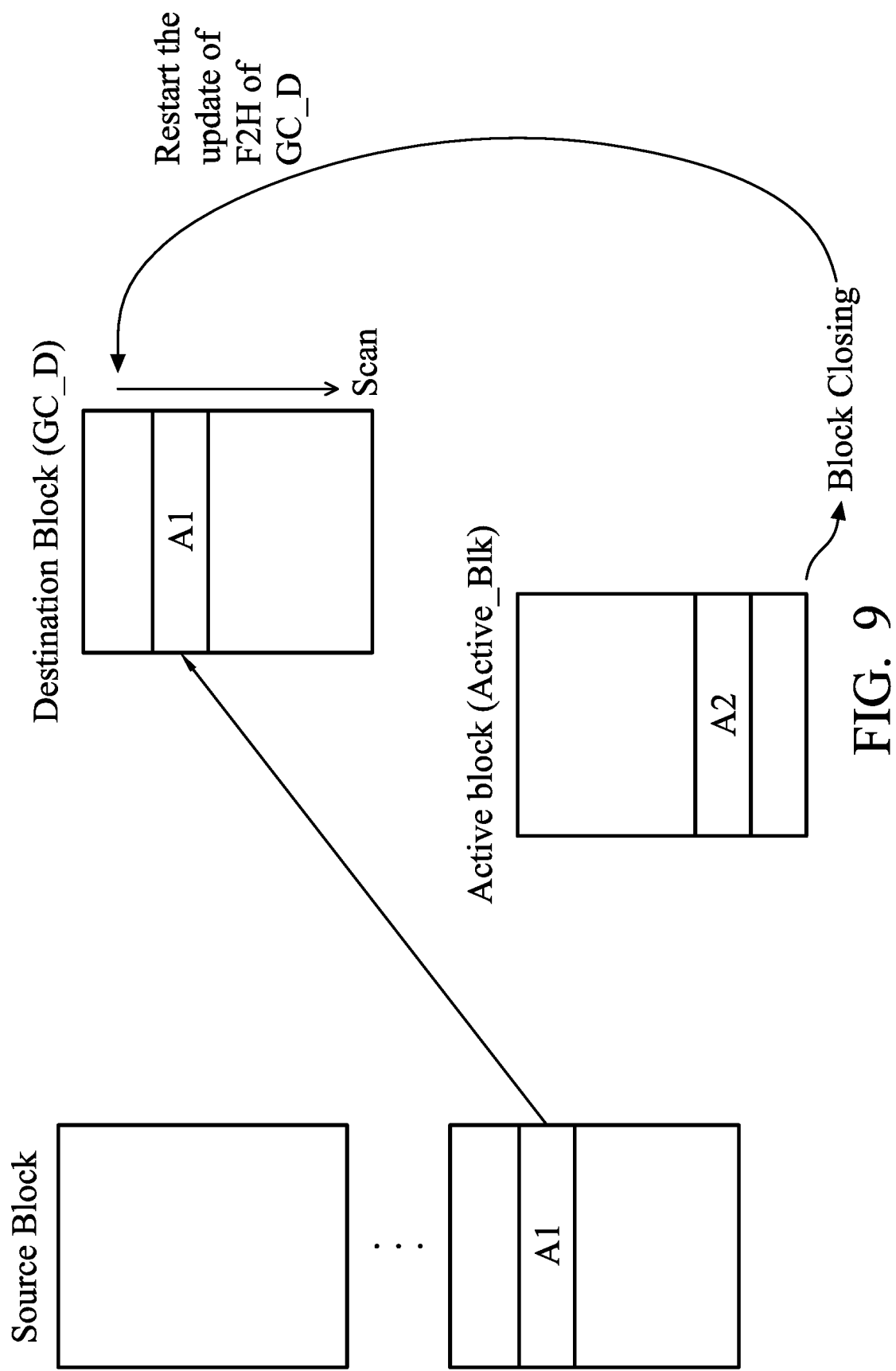
FIG. 9 shows an example for discussion of the reliability of a mapping table F2H of a destination block GC_D.

FIG. 9 shows an example for discussion of the reliability of a mapping table F2H of a destination block GC_D. After being copied from a source block GC_S to the destination block GC_D, data A1 is further modified to A2 and stored in the active block Active_Blk. When data A2 is written into the active block Active_Blk, the scan of the destination block GC_D for the organization of the mapping table F2H may already exceed the page storing data A1. It means that the A1 to A2 update has not happened yet when the scan proceeds to the page storing data A1. Thus, when the scan proceeds to the page storing data A1, the corresponding mapping information contained in the mapping table H2F is mapped to the source block GC_S and data A1 in the destination block GC_D is recognized as valid data. Although the corresponding mapping information in the mapping table H2F is changed to map to the active block Active_Blk after the update from data A1 to A2, the previously updated mapping table F2H of the destination block GC_D still erroneously shows that the data A1 in the destination block GC_D is valid. Fortunately, according to the disclosure (referring to steps S620 and S602), the scan on the destination block GC_D for updating the mapping table F2H is restarted when the active block Active_Blk is closed. It is obtained in the restarted scan procedure that the mapping information contained in the mapping table H2F corresponding to the data A1 in the destination block GC_D is mapped to the active block Active_Blk rather than a source block GC_S. Thus, data A1 in the destination block GC_D is correctly recognized as invalid data. According to the aforementioned techniques, the mapping table F2H established for the destination block GC_D has a high reliability.

Figure 10:
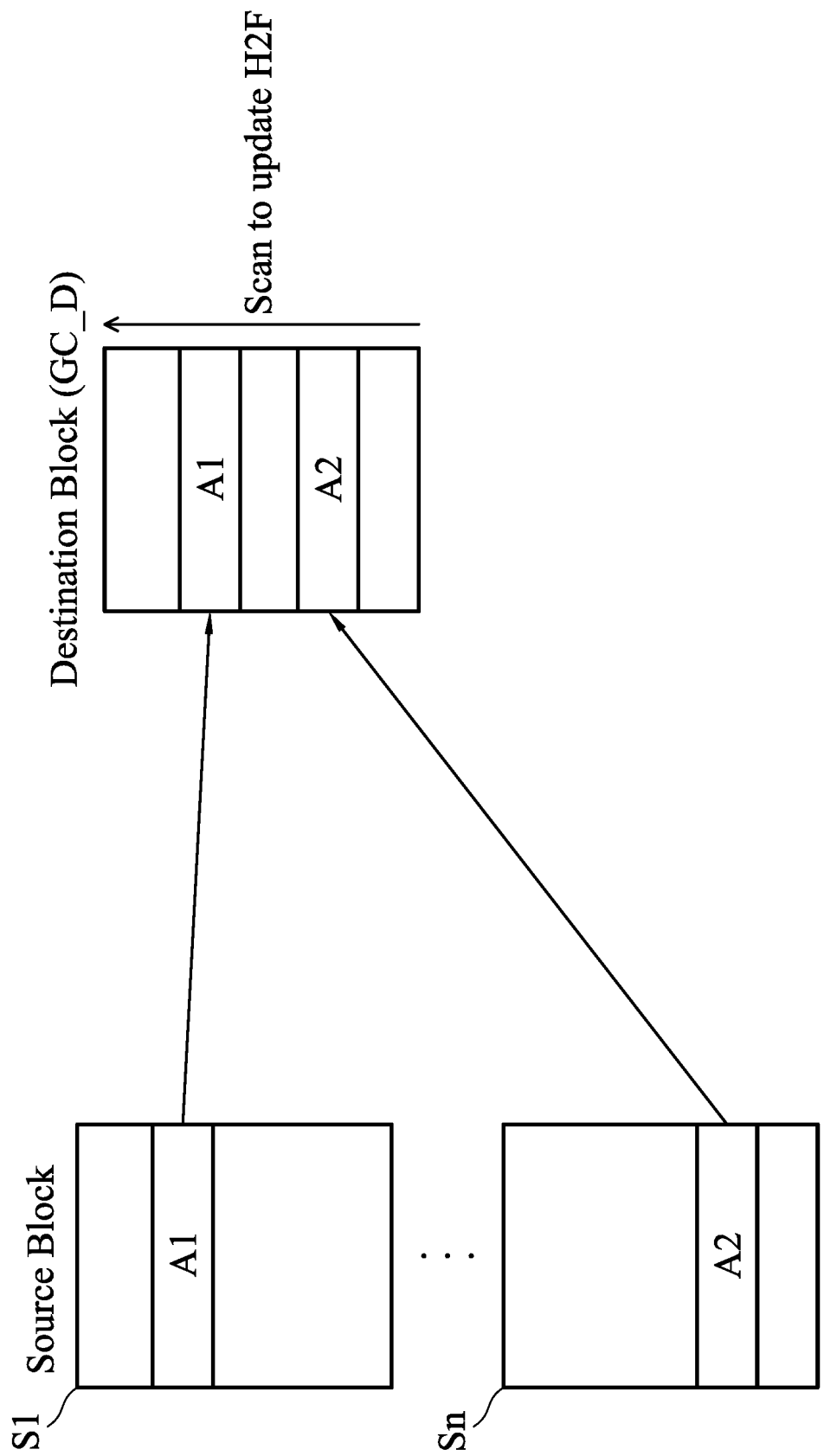
FIG. 10 shows an example for discussion of the reliability of a mapping table H2F.

FIG. 10 shows an example for discussion of the reliability of a mapping table H2F. Data A1 in a source block S1 is updated to A2 according to commands from the host 200 between the separate time intervals of garbage collection, and the active block with the data A2 written into is selected as another source block Sn later. As shown, data A1 and data A2 both are copied to the destination block GC_D during garbage collection. Before a reverse scan on the destination block GC_D that is performed to update the mapping table H2F based on the destination block GC_D, the mapping table H2F has been changed to show the mapping between the data A2 and the source block Sn. When the reverse scan on the destination block GC_D proceeds to data A2, the corresponding mapping information in the mapping table H2F is mapped to the source block Sn and therefore the data A2 in the destination block GC_D is recognized as valid. Accordingly, the corresponding mapping information in the mapping table H2F is updated to map to the data A2 in the destination block GC_D (referring to step S712 of FIG. 7A). When the reverse scan on the destination block GC_D proceeds to data A1, the corresponding mapping information in the mapping table H2F is mapped to the destination block GC_D and the data A1 in the destination block GC_D is regarded as invalid ("No" determined by step S706 of FIG. 7A). The mapping table H2F, therefore, does not erroneously map to the invalid data A1 in the destination block GC_D (because step S712 is skipped).

Figure 11:
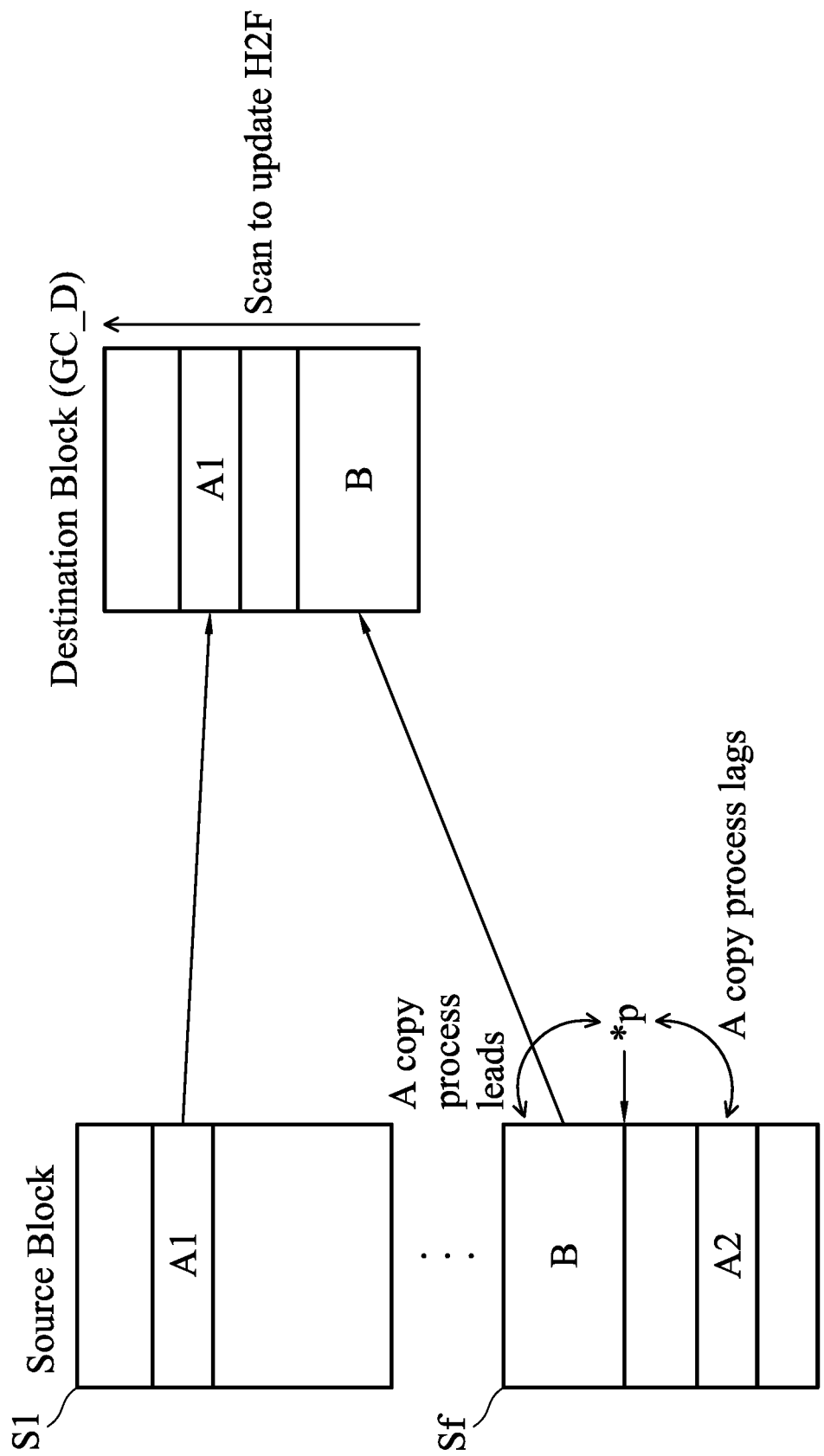
FIG. 11 shows another example for discussion of the reliability of a mapping table H2F.

FIG. 11 shows another example for discussion of the reliability of a mapping table H2F. Data A1 in a source block S1 is updated to A2 according to commands from the host 200 executed between the separate time intervals of garbage collection, and the active block with the data A2 written into is selected as the latest source block Sf later. The pointer *p indicates the progress of the copy process of valid data (referring to step S506 of FIG. 5). As shown, the data A1 has been copied from the source block S1 to the destination block GC_D. In the source block Sf, as indicated by the pointer *p, data B has been copied to the destination block GC_D and data A2 has not been copied to the destination block GC_D. Before scanning the destination block GC_D in a reverse direction to update the mapping table H2F as the procedure of FIG. 7A and FIG. 7B, the mapping information in the mapping table H2F shows the mapping between data A2 and the latest source block Sf. According to the procedure of FIG. 7A and FIG. 7B, when the reverse scan on the destination block GC_D proceeds to data B, the corresponding mapping information in the mapping table H2F maps data B to the source block Sf and, accordingly, the pointer *p (by step S710) is checked. Because the pointer *p shows that data B in the latest source block Sf has been copied to the destination block GC_D (i.e. the copy process of data B leads the pointer *p), data B in the destination block GC_D is regarded as valid and the corresponding mapping information in the mapping table H2F is changed to map to the destination block GC_D (referring to step S712). When the reverse scan on the destination block GC_D proceeds to data A1, the corresponding mapping information in the mapping table H2F i the source block Sf which triggers to check the pointer *p (by step S710). Because the pointer *p shows that data A2 in the latest source block Sf has not been copied to the destination block GC_D (i.e. the copy process of data A2 lags the pointer *p), data A1 in the destination block GC_D is regarded as invalid and the corresponding mapping information in the mapping table H2F is not erroneously changed to indicate the old data A1 in the destination block GC_D.

Other techniques that use the aforementioned concepts to segment a garbage collection operation are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory, comprising a plurality of physical blocks; and
a microcontroller, selecting one source block and one destination block from the plurality of physical blocks to perform a garbage collection operation to copy valid data from the source block to the destination block, wherein the microcontroller scans the destination block from an end of the destination block to perform a reverse scan for an update of a mapping table H2F and segments the reverse scan by performing the reverse scan at separate time intervals, the mapping table H2F shows a mapping relationship between logical addresses and physical addresses of data and the microcontroller executes commands issued by a host between the separate time intervals, wherein mapping information contained in the mapping table H2F for valid data within the source block that has not been copied to the destination block has a higher priority than mapping information collected by the reverse scan performed on the destination block.

2. The data storage device as claimed in claim 1, wherein:

the garbage collection operation comprises one or more valid data copy processes to copy the valid data from the source block to the destination block;

based on a pointer on which the latest valid data copy process has been performed, the microcontroller determines whether or not the source block has additional valid data that has not been copied to the destination block.

3. The data storage device as claimed in claim 2, wherein:

the microcontroller performs the reverse scan on the destination block by controlling a scan pointer;

when mapping information, contained in the mapping table H2F and corresponding to data indicated by the scan pointer, is mapped to the source block at a physical address that does not exceed physical address of the pointer, the microcontroller amends the mapping table H2F to map the data indicated by the scan pointer to the destination block.

4. The data storage device as claimed in claim 1, wherein:

a segmentation condition that has to be satisfied to interrupt the reverse scan, and segmenting the reverse scan relates to a predetermined time limit or a predetermined updated amount of the mapping table H2F.

5. A method for operating a data storage device, comprising:

selecting one source block and one destination block from a plurality of physical blocks of a non-volatile memory;

performing a garbage collection operation to copy valid data from the source block to the destination block, wherein the destination block is scanned from an end of the destination block to perform a reverse scan for an update of a mapping table H2F and the reverse scan is segmented by performing the reverse scan at separate time intervals, and the mapping table H2F shows a mapping relationship between logical addresses and physical addresses of data;

between the separate time intervals, executing commands issued by a host; and mapping information contained in the mapping table H2F for valid data within the source block that has not been copied to the destination block has a higher priority than mapping information collected by the reverse scan performed on the destination block.

6. The method as claimed in claim 5, wherein:

the garbage collection operation comprises one or more valid data copy processes to copy the valid data from the source block to the destination block; and the method further comprises determining whether or not the source block has additional valid data that has not been copied to the destination block based on a pointer on which the latest valid data copy process has been performed.

7. The method as claimed in claim 6, further comprising:

performing the reverse scan on the destination block by controlling a scan pointer; and when mapping information, contained in the mapping table H2F and corresponding to data indicated by the scan pointer, is mapped to the source block at a lower physical address that does not exceed physical address of the pointer, amending the mapping table H2F to map the data indicated by the scan pointer to the destination block.

8. The data storage device as claimed in claim 5, wherein:

a segmentation condition that has to be satisfied to interrupt the reverse scan, and segmenting the reverse scan relates to a predetermined time limit or a predetermined updated amount of the mapping table H2F.

* * * * *